United States Patent Office 3,114,642
Patented Dec. 17, 1963

3,114,642
HARD CANDY AND PROCESS FOR MAKING SAME
Harry Meisel, Englewood, N.J., assignor to Corn Products Company, New York, N.Y., a corporation of Delaware
No Drawing. Filed Apr. 20, 1962, Ser. No. 188,963
2 Claims. (Cl. 99—134)

This invention relates to a new and novel hard candy and to a method for making the same.

Hard candies of the type which this invention is concerned, i.e., of the non-graining type, have generally been made by cooking a mixture of corn sirup and sucrose or mixtures of sugars in solution to a dry substance content of at least about 96 percent. Flavors, chocolate, milk, etc., acids, such as citric, tartaric, etc., may be added as desired.

In the past, attempts to use dextrose in the manufacture of hard candies have always failed because the attempts were confined to partial replacement of the usual quantities of sucrose. Dextrose has partially replaced sucrose successfully and with improvements in certain candies, such as jellies, ungrained marshmallows, nougats, cherry candies, but never in hard candies, and it is the commonly held opinion in the confectionery industry that dextrose cannot replace sucrose completely in candies. (See page 10, "Choice Confections," Walter L. Richmond, 1954, Manufacturing Confectioner Publishing Company.)

And it has been known that hard candies containing too high an amount of dextrose derived from the corn sirup component have a pronounced tendency to pick up moisture rapidly from the atmosphere resulting in a sticky candy, although the reason has not been satisfactorily explained.

I have now discovered how to successfully produce a hard candy with all the desirable properties from starch conversion sirups and dextrose plus the aforesaid flavors, etc., as desired. In accordance with my invention I have found that by substantially eliminating sucrose from the usual formulas for making hard candy and substituting dextrose therefor, I can produce candies with improved properties over those made with sucrose and starch conversion sirups. This is, indeed, a radical departure from conventional practice and the results obtained are most unexpected.

It is well known in the industry that one of the more significant contributory causes of hygroscopicity in hard candy is the formation of invert sugar from the sucrose component, in the course of processing. Hence, by the complete elimination of sucrose from my novel candy, the concomitant hygroscopicity due to formation of invert sugar is consequently eliminated. This is a significant advantage over conventional hard candy practices as to quality.

Another advantage is that my novel candy will have a better finished color than conventional products. A further advantage resides in the fact that liquid non-crystallizing mixtures of starch conversion sirups and dextrose can be made available to candy manufacturers, thus, facilitating handling costs, reduction in inventory, and housing, etc., plus other advantages of handling liquid sugars in bulk.

I believe that the reason dextrose cannot be present concurrently with sucrose and starch conversion sirups beyond limited amounts in hard candies made therefrom can be explained, as follows, although I do not wish to be bound by this theory.

It is reasonable to assume that the hygroscopicity or stickiness of hard candies is proportional to the solubility of the sugars present in the hard solid solution; thus, a candy composed of a sugar system of high solubility, e.g., sucrose-dextrose, sucrose-levulose, will rapidly pick up moisture from the atmosphere and start a solution effect which will be manifested by the sensation of stickiness when touched; and conversely candies composed of a sugar system of lesser solubility will manifest the stickiness to a lesser degree.

From the data "Saturation Relations in Mixtures of Sucrose, Dextrose, Levulose," Jackson and Silsbee (Technologic Papers of the Bureau of Standards, No. 259 (1924)), it has been shown that a mixture of sucrose and dextrose will dissolve to the extent of 280 grams in 100 grams of water whereas sucrose alone will dissolve only to the extent of 214 grams in 100 grams of water and dextrose alone will dissolve only to the extent of 120 grams in 100 grams of water (at 30° C.). It is evident that the mixed system of sucrose and dextrose has a solubility 30 percent higher than sucrose alone. Similarly, the mixed system of invert sugar and sucrose at the same temperature has a solubility of 371 grams in 100 grams of water and the increase in solubility over sucrose alone is 73 percent. This increased solubility can be related to the hygroscopicity of sucrose-dextrose systems and sucrose-levulose systems in hard candies. And it is for this reason, I believe, that attempts in the past to make partial replacements of sucrose in hard candy were unsuccessful due to the marked increase in the solubility of the mixed sugar system with its attendant increase in hygroscopicity. Thus, by means of my new approach in which the sucrose is eliminated and the higher solubility phenomenon of the mixed sugar systems correspondingly suppressed, satisfactory hard candies can be produced by the use of starch conversion sirups and dextrose, substantially free of sucrose.

The starch conversion sirups which may be used in my invention may be the usual commercial sirups of commerce, e.g., corn sirup made by the acid hydrolysis or acid-enzyme hydrolysis of starch ranging in D.E. values (dextrose equivalent) from 36 to 64 percent. Generally, sirups having a D.E. value of about 39 to 42 percent are used. A typical analysis of such a corn sirup (42 D.E.) is set forth below:

|  | Percent |
|---|---|
| Monosaccharides (all dextrose) | 19.3 |
| Disaccharides (mostly maltose) | 14.3 |
| Trisaccharides | 11.8 |
| Tetrasaccharides | 10.0 |
| Pentasaccharides | 8.4 |
| Hexasaccharides | 6.6 |
| Heptasaccharides and higher | 29.6 |

Sirups made by the use of enzymes as converting agents for starch may also be used.

Analysis of such typical sirups are given in Table I.

TABLE I

|  | A | B | C | D |
|---|---|---|---|---|
| Baumé, degrees | 43 | 43 | 43 | 43 |
| D. E. percent | 51 | 55 | 64 | 43 |
| Monosaccharides (all dextrose) do | 20.0 | 30.8 | 37.0 | 4.7 |
| Disaccharides (mostly maltose) do | 31.0 | 18.1 | 31.5 | 35.7 |
| Trisaccharides do | 18.0 | 13.2 | 11.0 | 10.2 |
| Tetrasaccharides do | 6.0 | 9.5 | 5.0 | 2.4 |
| Pentasaccharides do | 4.0 | 7.2 | 4.0 | 1.4 |
| Hexasaccharides do | 3.0 | 5.1 | 3.0 | 1.2 |
| Heptasaccharides and higher do | 18.0 | 16.1 | 8.5 | 24.4 |

(A) Made by acid-enzyme conversion. Refined with ion exchange resins.
(B) Made by acid conversion. Refining with higher percentage of carbon than usual sirups.
(C) Made by acid-enzyme conversion. Ion exchange plus carbon refining.
(D) Made by acid-enzyme (malt) conversion.

In carrying out my invention, I may use a wide variety of combinations of dextrose and starch conversion sirups. The maximum amount of dextrose is governed by the sweetness desired. The minimum amount of sirup is governed by the hardness or brittleness desired. Generally, a satisfactory candy may be produced by using any amount of sirup up to about 70 percent, dry basis, and the balance dextrose. A practical operating range is 30 parts of sirup, by weight: 70 parts of dextrose, by weight, to 70 parts of sirup, by weight: 30 parts of dextrose, by weight, although when using special sirups containing larger quantities of higher molecular weight carbohydrates than the ordinary sirup of commerce, the amount of dextrose may be greater.

The process which I use is substantially the same as the process presently used for hard candy. The dextrose is dissolved in a minimum amount of water, the sirup added and the mixture cooked either by the open-fire cook method or the vacuum cook method.

The vacuum cook method is as follows:

Dextrose is dissolved in the minimum amount of water and mixed with the starch conversion sirup. The mixture is cooked at atmospheric pressure until the temperature reaches 238–240° F. and the solids content is 84–86 percent. This material is pumped through a cooker which is under vacuum (26–29 inches) and at a temperature of 290 to 300° F. until the moisture is reduced to about 1 percent. To the molten glassy-like material is then added any desirable flavor and/or acid and the material is then kneaded and cooled to about 220 to 250° F. at which temperature it is still plastic. Then it is placed in various candy-forming machines to produce desired shapes, allowed to cool to room temperature and packed.

The following examples which are typical and informative only and in no way limiting the invention will further illustrate the invention.

*Example I*

Sixty parts by weight of an acid converted corn starch sirup having a density of 43° Bé. and a D.E. value of 42 percent was mixed with 40 parts of dextrose hydrate and 18 parts of water. The resultant mixture was cooked in an open kettle until a temperature of 325° F. was attained. The molten, glassy mass was allowed to cool to room temperature and flavor added and cut to the desired shape and allowed to harden. The candy was clear, pale yellow color, brittle and remained remarkable non-hygroscopic after 2 months in ordinary packing.

*Example II*

Example I was repeated except 60 parts of a sirup having the characteristics described in Table I under "D" was used. The candy had essentially the same characteristics as the candy from Example I, except it was colorless.

*Example III*

Example II was repeated except 50 parts of the sirup described was used with 50 parts of dextrose hydrate and 15 parts of water. The candy had the same characteristics as that from Example II.

*Example IV*

Example I was repeated using a longer time to attain the temperature of 325° F., thus producing a clear, colorless candy which was brittle and non-hygroscopic.

I claim:

1. A hard candy substantially non-hygroscopic comprising a mixture of dextrose and starch hydrolysate sirup processed to form hard candy; the amounts of said dextrose and said sirup falling within the range of 30 parts of sirup, by weight: 70 parts of dextrose, by weight, to 70 parts of sirup, by weight: 30 parts of dextrose, by weight; said sirup having a D.E. value of about 36 to about 64 percent.

2. A process for making hard candy substantially non-hygroscopic which comprises cooking a mixture of starch hydrolysate sirup and a solution of dextrose until the moisture is reduced to about 1 percent, cooling the mass and permitting it to harden; the amounts of said dextrose and said sirup falling within the range of 30 parts of sirup, by weight: 70 parts of dextrose, by weight, to 70 parts of sirup, by weight: 30 parts of dextrose, by weight; said sirup having a D.E. value of about 36 to about 64 percent.

References Cited in the file of this patent

UNITED STATES PATENTS

| | | |
|---|---|---|
| 1,928,901 | Krno et al. | Oct. 3, 1933 |
| 1,939,990 | Krno et al. | Dec. 19, 1933 |